(12) United States Patent
Bezzubtseva et al.

(10) Patent No.: US 11,604,855 B2
(45) Date of Patent: Mar. 14, 2023

(54) METHOD AND SYSTEM FOR DETERMINING RESPONSE FOR DIGITAL TASK EXECUTED IN COMPUTER-IMPLEMENTED CROWD-SOURCED ENVIRONMENT

(71) Applicant: YANDEX EUROPE AG, Lucerne (CH)

(72) Inventors: Anastasiya Aleksandrovna Bezzubtseva, Lipetsk (RU); Valentina Pavlovna Fedorova, Sergiev Posad (RU); Alexey Valerievich Drutsa, Moscow (RU); Aleksandr Leonidovich Shishkin, Moscow (RU); Gleb Gennadevich Gusev, Moscow (RU)

(73) Assignee: YANDEX EUROPE AG, Lucerne (CH)

( * ) Notice: Subject to any disclaimer, the term of this patent is extended or adjusted under 35 U.S.C. 154(b) by 525 days.

(21) Appl. No.: 16/904,742

(22) Filed: Jun. 18, 2020

(65) Prior Publication Data
US 2021/0073596 A1    Mar. 11, 2021

(30) Foreign Application Priority Data
Sep. 5, 2019 (RU) .......................... RU2019128018

(51) Int. Cl.
*G06F 18/20* (2023.01)
*G06F 17/40* (2006.01)
(Continued)

(52) U.S. Cl.
CPC .............. *G06F 18/24* (2023.01); *G06F 18/22* (2023.01); *G06N 7/01* (2023.01); *G06N 20/00* (2019.01); *G06Q 50/01* (2013.01)

(58) Field of Classification Search
USPC ........ 382/100–107, 113, 128–140, 154–160, 382/190–225; 704/1–275; 706/1–62,
(Continued)

(56) References Cited

U.S. PATENT DOCUMENTS 11,120,364 B1 *  9/2021  Gokalp .................. G06N 20/00
2009/0157486 A1 *  6/2009  Gross .................. G06Q 30/0217
                                                              705/15
(Continued)

*Primary Examiner* — Marcellus J Augustin
(74) *Attorney, Agent, or Firm* — BCF LLP

(57) ABSTRACT

Disclosed are a method and a system for determining a response to a digital task in a computer-implemented crowd-sourced environment. The method comprises determining if a number of the plurality of responses to the digital task received meets a pre-determined minimum answer threshold; in response to the number of the plurality of responses to the digital task meeting the pre-determined minimum answer threshold, executing: for each of the plurality of responses generating, by the server, a confidence parameter representing a probability of an associated one of the plurality of responses being correct; ranking the plurality of responses based on the confidence parameter to determine a top response being associated with a highest confidence parameter; and in response to the highest confidence parameter being above a pre-determined minimum confidence threshold, assigning a value of the top response as a label for the digital task and terminating the digital task execution.

20 Claims, 5 Drawing Sheets

(51) Int. Cl.
  *G06F 16/953* (2019.01)
  *G06F 16/903* (2019.01)
  *G06N 3/08* (2023.01)
  *G06N 3/02* (2006.01)
  *G06F 18/24* (2023.01)
  *G06N 20/00* (2019.01)
  *G06Q 50/00* (2012.01)
  *G06F 18/22* (2023.01)
  *G06N 7/01* (2023.01)

(58) Field of Classification Search
  USPC ................................................ 706/900–90
  See application file for complete search history.

(56) References Cited

U.S. PATENT DOCUMENTS

| | | | | |
|---|---|---|---|---|
| 2012/0130934 A1* | 5/2012 | Brillhart | ........... | G06F 16/24578 706/46 |
| 2015/0186784 A1* | 7/2015 | Barborak | ................. | G06N 5/04 706/11 |
| 2017/0161477 A1* | 6/2017 | Liu | ........................ | G06N 20/00 |
| 2017/0323211 A1* | 11/2017 | Bencke | .............. | G06Q 10/0639 |
| 2019/0279270 A1* | 9/2019 | Reddy | ....................... | G06F 7/02 |
| 2020/0160116 A1* | 5/2020 | Fedorova | ............... | G06N 20/00 |
| 2020/0160946 A1* | 5/2020 | Poblenz | ................. | G06V 10/82 |

* cited by examiner

METHOD AND SYSTEM FOR DETERMINING RESPONSE FOR DIGITAL TASK EXECUTED IN COMPUTER-IMPLEMENTED CROWD-SOURCED ENVIRONMENT

CROSS-REFERENCE

The present application claims priority to Russian Patent Application No. 2019128018, entitled "Method and System for Determining Response for Digital Task Executed in Computer-Implemented Crowd-Sourced Environment," filed Sep. 5, 2019, the entirety of which is incorporated herein by reference.

FIELD

The present technology relates to methods and systems for determining a response for a digital task, and more particularly to methods and systems for determining the response to the digital task executed in a computer implemented crowd-sourced environment.

BACKGROUND

Today many Internet companies use machine learning algorithms (MLAs) that require a large amount of labelled data to be trained to solve different tasks. Some examples of such tasks include image classification using deep neural networks, learning to rank documents using gradient boosting methods, recognizing text on an image using optical character recognition (OCR) model, prediction of most suitable search results, most relevant music recommendation, a maneuver for a self driving car, or the like.

Labeled data sets are usually obtained either using user interactions with various digital items in a computer environment (e.g., implicit feedback from user behaviour—for example, user interactions with search results obtained from a search engine in a form of a Search Engine Results Page (SERP)), or with manual labelling, which, in turn, can be performed by experts or using crowds of non-professional assessors (also known as "workers"). Crowdsourcing has become more popular over the years, as crowd labels are less expensive, yet they reflect the diversity of opinions and preferences expressed by non-experts.

As such, many large Internet companies make use of crowdsourcing to efficiently collect large amounts of data needed for creating products based on MLAs. A significant source of such labels is (re)CAPTCHA used by large online services to distinguish human requests from automated bots. It is a known limitation of crowd labels is their low quality. This becomes a critical issue in the case of CAPTCHA, where a significant proportion of responses are produced by bots (software applications). An important component of data collection in this case is the reduction of noisy labels made by non-qualified users and bots.

CAPTCHA, which originally stood for "completely automated public Turing test to tell computers and humans apart", was originally introduced as an automated test to differentiate a human from a computer. A most common implementation of CAPTCHA is a task asking a user to recognize a sequence of characters that are distorted so that modern automated algorithms fail to recognize it, but humans can still decipher the sequence with little effort. Such tests have a wide rage of online applications including preventing dictionary attacks in password systems, stopping automatic account creation, avoiding spam comments etc.

Later, reCAPTCHA was introduced. The idea of reCAPTCHA is to mix unknown (unrecognized) words or images with known ones in the same task. The user must provide answers for both parts, thus human effort is utilized to obtain new information and label new data (i.e. using input as a label for the unknown words/images).

US patent application 2017/161477 (Liu et al., published Jun. 8, 2017) discloses systems and methods of determining image characteristics are provided. More particularly, a first image having an unknown characteristic can be obtained. The first image can be provided to a plurality of user devices in a verification challenge. The verification challenge can include one or more instructions to be presented to a user of each user device. The instructions being determined based at least in part on the first image. User responses can be received, and an unknown characteristic of the first image can be determined based at least in part on the received responses. Subsequent to determining the unknown characteristic of the first image, one or more machine learning models can be trained based at least in part on the determined characteristic.

SUMMARY

Non-limiting embodiments of the present technology have been developed based on developers' appreciation of at least one technical problem associated with the prior art solutions. Developers of the present technology have appreciated certain technical drawbacks associated with the existing prior art systems and methods. In a nutshell, a particular problem associated with collection of data from CAPTCHA is that the user identification is not feasible. Thus, it is not possible to use user historical data to verify or "weight" the response. Another particular problem associated with collection of data from CAPTCHA is that the crowd sourced assessors are usually comprised of a mix of human assessors and bots.

Broadly speaking, non-limiting embodiments of the present technology are directed to a new algorithm for aggregation of multiple responses obtained in a computer-implemented crowd-sourced environment. The computer-implemented crowd-sourced environment can be for labelling or otherwise obtaining a response to the digital task.

One example of such digital task is obtaining a response representative of what is depicted on a CAPTCHA image presented for labelling to a crowd-sourced worked in a computer-implemented crowd-sourced environment. The CAPTCHA image may be un-recognized and, thus, embodiments of the present technology may result in a label being assigned to the CAPTCHA image.

Although crowdsourcing can provide a large amount of labels at minimal costs, crowd labels are much noisier than those of experts, since crowd-sourced assessors vary in levels of expertise. To this end, different techniques for eliciting and processing collected labels have been suggested. It is known to use overlapping labelling techniques where each task is solved by several crowd-sourced assessors. These conventional methods identify users that often contradict to the majority and lessen the impact of their noisy answers.

More specifically, a typical approach to label data with a desired level of accuracy in a crowd-sourced environment is to obtain multiple noisy labels for each object and then aggregate them into a more reliable aggregated label using a trained model. The intuition behind prior art aggregation methods is to use different statistics representative of the history of crowd-sourced assessors' answers to assign weights to the generated "noisy" labels.

There is, however, a class of crowd-sourced tasks, for which the identification of crowd-sourced assessors may be impossible and, as such, the known aggregation algorithms either do not work or boil down to a Majority Vote (MV) model. A typical MV model involves choosing a label with a maximum number of votes for the "winning" label. The MV model can perform poorly under certain conditions. For example, the accuracy of the MV answer becomes significantly worse when more than 30% of users are spammers or robots.

Models using meta information about crowd-sourced assessors and tasks are also known, but these models are not useful when there is no possibility for identification of crowd-sourced assessors as these known models require a history for each crowd-sourced assessor to represent him or her to de-his or noise her assigned labels (i.e. responses). Some known methods of incremental re-labelling suggested minimizing the number of labels per object by assigning tasks to more suitable crowd-sourced assessors, which is also not applicable in an environment where crowd-sourced assessors can not be identified.

There are also known approaches to incremental re-labelling for classification tasks. These models use a stopping trigger that is based on statistics about accumulated labels, which requires to apriori know the number of possible labels (i.e. an apriori knowledge of possible responses). For example, such a trigger can be based on the statistics representative the number of votes for the two most popular answers. However, these known approaches are only suitable when the set of possible labels is fixed and is not suitable for an environment where the number of possible labels is large or is close to infinite.

Thus, it can be said that there are two differences between labels obtained using general crowdsourcing techniques and those obtained using CAPTCHA images. First, a high fraction of non-human guesses makes it difficult to obtain an accurate aggregated answer using data collected via CAPTCHA. It is known that on crowdsourcing platforms, the majority of users are proper human crowd-sourced assessors performing tasks as requested, and using the MV model among crowdsourced answers as the aggregated answer is a strong baseline for aggregation techniques.

In CAPTCHA, more than 55% of guesses are submitted by automated solvers (machine learned OCR models). The main concern about automatic solvers is that all guesses of a single solver are identical and agree with each other. So the MV response accuracy might drop to the level of solver's accuracy. Even if the solver's accuracy is comparable to human performance (which is rare), using one OCR model solutions as training labels for another model is unlikely to boost the performance of the second model. Thus, the MV response is often less reliable for training OCR algorithms.

Second, user identification in CAPTCHA is not available. The reason is that there are specialized ecosystems for solving CAPTCHAs in real-time, which work by combining both software solvers and human crowd-sourced assessors. In such a situation, a user submitting her answer to CAPTCHA often is not the one who is producing the answer. Therefore, a history of user answers cannot be used to estimate her quality level, as it is done in crowdsourcing.

To sum up, the non-limiting embodiments of the present technology have been developed based on inventors' recognition of two specific problem with image recognition that make aggregating responses more difficult than for classification: first, the number possible answers for a recognition task is infinite; second, answers for recognition tasks may be partially correct.

The non-limiting embodiments of the present technology address the above mentioned problems and shortcomings of the prior art approaches by methods for collecting recognized text from users solving CAPTCHA (as an example of a broader class of digital tasks to be executed in the computer-implemented crowd-sourced environment), when reliable identification of users is impossible. Broadly speaking, this class of digital tasks can be identified as extracting data from anonymous noisy labels.

Broadly speaking, the non-limiting embodiments of the present technology are directed to data collection that uses incremental (i.e. dynamic) relabelling, which adaptively chooses the number of responses needed for obtaining the aggregated response to the digital task of an acceptable accuracy. The non-limiting embodiments of the present technology are also directed to determining a stopping trigger of the incremental relabelling that is based on a confidence model for generating a confidence parameter associated with collected responses.

In some non-limiting embodiments of the present technology, a digital task presented to a crowd-sourced worker comprises two parts: an unknown object, which needs to be labelled, and a control object, for which the correct label is known and is used to assess the reliability of the crowd-sourced worker. Responses for unknown objects are called "guesses".

Responses for the digital tasks are collected sequentially, and after obtaining a new guess for an object, the non-limiting embodiments of the present technology make a decision: whether to request an additional answer for the object or to produce the aggregated answers using accumulated guesses (i.e. to stop additional labelling process). The goal is to produce accurate aggregated answers using a minimal number of raw guesses.

As an example, two sets of images can be given:
W, where each image w∈W contains an unknown word that should be recognized by portion of the plurality of assessors;
$W_c$, where each image w∈$W_c$ contains a known control word.

Each time a CAPTCHA task is shown, a user receives two images for recognition: w∈W and $w_c$∈$W_c$. The user inputs words shown on the images (she makes a guess per word). If the user's guess for the control image $w_c$ is correct, her guess for the unknown word w is recorded for further processing (by adding the guess to the set $G_w$ of accumulated guesses for this word); otherwise, no guess is recorded.

In this way, each unknown word w∈W is presented to several users. When the image w receives a minimal number of guesses, the guesses are processed to be compared to a certain stopping trigger.

If the stopping trigger is met, the obtained guesses $G_w$ for the image w are processed with a certain aggregation mechanism that derives an aggregated answer, which is used as the recognized word in the image w (i.e., the image's word is assumed to be recognized); otherwise, the image w is sent to another user.

In order to collect responses efficiently, the non-limiting embodiments of the present technology are directed to a process of incremental labelling: guesses for words in W are requested sequentially; after receiving a new guess the system uses a stopping trigger to test whether an additional guess for the word is required. The process of obtaining an aggregated answer for a given image w∈W using the non-limiting embodiments of the present technology can be summarized as follows:

First, the non-limiting embodiments of the present technology acquire $N_{min}$ initial guesses for word w. The number $N_{min}$ is a parameter, which can be set according to a given implementation requirements or it can be fitted to control the accuracy of the non-limiting embodiments of the present technology and the budget spent.

At each next step, all guesses accumulated up to the then current moment for image w are grouped to obtain the set of unique answers $U_w$. For each answer a E $U_w$, the non-limiting embodiments of the present technology estimate the confidence $w_{w,a}$ for a to be the correct answer for image w. The answer $a_w$ with the highest estimated confidence $c_{a_w,w}$, is used as the current aggregated answer for image w.

If the estimated confidence $c_{a_w,w}$ of the current aggregated answer $a_w$ for the word w is greater than or equal to t, the word w with the answer $a_w$ is added to the set of labelled words, and the non-limiting embodiments of the present technology stop collecting guesses for this word. If the estimated confidence is less than t and n is less than $N_{max}$, an additional guess for the word w is acquired.

Otherwise, the image with the word w is considered as unreadable and the non-limiting embodiments of the present technology stop collecting guesses for this word.

In accordance with the non-limiting embodiments of the present technology, a confidence $c_{a_w,w}$ of an answer a∈$U_w$ for an image w can be calculated as follows. For confidence estimation, the non-limiting embodiments of the present technology build a model based a vector of features $f_{w,a}$, which describe answer a, image w, and accumulated guesses $G_w$ for the given image. The purpose of the model is to estimate the conditional probability $P(a=tw|f_{w,a})$ that answer a is the true answer tw for image w given features $f_{w,a}$.

In accordance with the non-limiting embodiments of the present technology, a prediction model is trained. The prediction model is trained to predict whether a guess a is the true answer for any possible guess. For that purpose, the non-limiting embodiments of the present technology set the target for the dataset to 1 if the answer $a_w$ matches the correct one or 0 if otherwise. This definition of target for a classifier allows the non-limiting embodiments of the present technology to use the classifier for predictions with a potentially infinite number of classes.

In accordance with the non-limiting embodiments of the present technology, the trained model uses a plurality of features for predicting whether a given answer is a correct answer, as outlined immediately above. Examples of features are presented below for a given word w with its guesses $G_w$ and a given answer a∈$U_w$.

| Group | Feature |
|---|---|
| Answer | The answer a has capital characters |
| | The answer a has punctuation |
| | The answer a has latin characters |
| | The answer a has digits |
| | The answer a has Cyrillic characters |
| OCR | The Levenshtein distance (LD) between the answer a and the OCR model's guess $a_w^{OCR}$ |
| | Confidence for the OCR model's guess $a_w^{OCR}$ estimated by the OCR model |
| Popularity | Fraction of votes for the answer a in $G_w$ |
| | The Levenshtein distance (LD) between the answer a and the MV answer $a^{MV}(G_w)$ |
| | Fraction of votes for the answer a to that for the MV answer $a^{MV}(G_w)$ |
| | The number of answers $|U_x|$ relative to the number of guesses $|G_w|$ |
| Position | A ratio for showing w to the left of a control word and that to the right, over $G_w(a)$ |
| | Fraction of inputs in $G_w(a)$ when the answer a was to the right of a control word |
| | Difference between the ratio for showing w to the left of a control word and that to the right, over $G_w(a)$ |
| | Fraction of inputs $G_w(a)$ when the answer a was to the left of a control word |
| Time | Median input time in $G_w(a)$ relative to the length of the answer a in characters |
| | Average input time for the guesses $G_w(a)$ relative to the length of the answer a in characters |
| | Maximal input time for the guesses $G_w(a)$ |
| | 25th percentile input time for the guesses $G_w(a)$ |
| | Minimal input time for the guesses $G_w(a)$ |
| | Median input time for the guesses $G_w(a)$ |
| | 25th percentile time of day for the guesses $G_w(a)$ |
| | Median time of day for the guesses $G_w(a)$ |
| | 75th percentile time of day for the guesses $G_w(a)$ |
| | 75th percentile input time for the guesses $G_w(a)$ |
| | Minimum input time for the guesses $G_w(a)$ relative to the average time |
| | Minimum input time for the guesses $G_w(a)$ relative to the maximum time |
| | Average time of day for the guesses $G_w(a)$ |
| | Average input time for the guesses $G_w(a)$ |

In additional non-limiting embodiments of the present technology, the prediction model can use the guess of the OCR model, which is denoted by $a_w^{OCR}$ for each word w.

In order to set the parameters $N_{min}$, $N_{max}$, and t, the non-limiting embodiments of the present technology run simulations of the algorithm with different combinations of the parameters on the validation dataset. For each combination of the parameters on a grid, the non-limiting embodiments of the present technology calculate the target metrics (e.g. the average number of guesses per word, the average accuracy of the aggregated answers). Finally, the non-limiting embodiments of the present technology settle with the parameters which satisfy our metric requirements (e.g. minimize the number of guesses while maximizing the accuracy).

In some non-limiting embodiments of the present technology, the prediction model can be expressed in a pseudo-code as follows:

```
Input:
W - set of unknown images
W_c - set of images with known correct answers
N_min - minimum number of guesses
N_max - maximum number of guesses
t - threshold for the confidence score
model - treeCAPTCHA confidence model
Initialize: labeled_words := { }
for w in W do
    guesses := [ ]
    n := 0
    while n < N_max do
        w_c := select_random_word(W_c)
        image := combine_words(w,w_c)
        guess_w, guessw_c := wait_for_guess(image)
        if guessw_c ≠ w_c then
            continue
        end if
```

-continued

```
        n := n + 1
        guesses.append(guess_w)
        if len(guesses) < N_min then
            continue
        end if
        features := calc_features(guesses)
        scores := calc_confidence(model, features)
        a_w, confidence := get_most_confident_word(scores)
        if confidence ≥ t then
            labeled_words[w] := a_w
            break
        end if
    end while
end for
```

In accordance with a first broad aspect of the present technology, there is provided a method for determining a response to a digital task, the digital task executed in a computer-implemented crowd-sourced environment, the computer-implemented crowd-sourced environment being accessible by a plurality of crowd-sourced assessors, the method being executed by a server accessible, via a communication network, by electronic devices associated with the plurality of crowd-sourced assessors, the server executing the computer-implemented crowd-sourced environment. The method comprises: acquiring, by the server, from a first subset of the plurality of crowd-sourced assessors a plurality of responses to the digital task; determining, by the server, if a number of the plurality of responses to the digital task meets a pre-determined minimum answer threshold; in response to the number of the plurality of responses to the digital task meeting the pre-determined minimum answer threshold, executing: for each of the plurality of responses generating, by the server, a confidence parameter representing a probability of an associated one of the plurality of responses being correct; ranking the plurality of responses based on the confidence parameter to determine a top response being associated with a highest confidence parameter; in response to the highest confidence parameter being above a pre-determined minimum confidence threshold, assigning a value of the top response as a label for the digital task and terminating the digital task execution; in response to the highest confidence parameter being below the pre-determined minimum confidence threshold, causing an additional response to be solicited from at least one additional crowd-sourced assessors of the of the plurality of crowd-sourced assessors.

In some implementation of the method, in response to the highest confidence parameter being below the pre-determined minimum confidence threshold, the method further comprises: checking if the number of the plurality of responses is below a pre-determined maximum number of solicited responses and in response to a positive determination, executing the causing the additional response to be solicited.

In some implementation of the method, in response to the highest confidence parameter being below the pre-determined minimum confidence threshold, the method further comprises: checking if the number of the plurality of responses is above a pre-determined maximum number of solicited responses and in response to a positive determination, not executing the causing the additional response to be solicited; and determining that the digital task can not be completed in the computer-implemented crowd-sourced environment.

In some implementation of the method, the digital task is of a type having an infinite number of possible correct answers.

In some implementation of the method, the digital task is an image recognition task.

In some implementation of the method, the image is a CAPTCHA type image.

In some implementation of the method, the digital task comprises assigning a label to a digital object.

In some implementation of the method, the label is one of a binary label and a categorical label.

In some implementation of the method, the generating, by the server, the confidence parameter comprises applying a Machine Learning Algorithm (MLA) to generate the confidence parameter.

In some implementation of the method, the MLA generates the confidence parameter based on a feature vector, including a plurality of dimensions; a first dimension being associated with a given response; a second dimension being associated with an associated digital task; and a third dimension being associated other responses of the plurality of responses.

In some implementation of the method, the first dimension includes features representative of at least one of:
whether the given response has capital characters;
whether the given response has punctuation;
whether the given response has Latin characters;
whether the given response has digits;
whether the given response has Cyrillic characters;
a Levenshtein distance (LD) between the given response and an OCR model prediction of a content of the digital task; and
a confidence for the OCR model prediction.

In some implementation of the method, the second dimension includes features representative of at least one of:
a ratio of showing the digital task left or right of a control word, over the plurality of responses received till this moment
a fraction of inputs in the plurality of responses received till this moment when the digital task was to the right of the control word;
a difference between the ratio for showing the digital task to the left of the control word and to the right, over all the plurality of responses received till this moment;
a fraction of inputs in the plurality of responses when the digital task was to the left of the control word.

In some implementation of the method, the third dimension includes features representative of at least one of:
a fraction of votes for a given answer the plurality of responses in the responses collected till the current moment;
a Levenshtein distance (LD) between the plurality of responses and a majority vote response
a fraction of votes for the plurality of responses to that for the majority vote response;
a number of responses for known digital tasks relative to a number of responses to unknown tasks;
a median input lime in the plurality of responses relative to the length of the plurality of responses in characters;
an average input lime for the plurality of responses relative to the length of the plurality of response in characters;
a maximal input time for the plurality of responses;
a 25th percentile input time for the plurality of responses;
a minimal input time for the plurality of responses;
a median input time for the plurality of responses;
a 25th percentile time of day for the plurality of responses;
a median lime of day for the plurality of responses;

a 75th percentile time of day for the plurality of responses;
a 75th percentile input time for the plurality of responses;
a minimum input time for the plurality of responses relative to an average time;
a minimum input time for the plurality of responses to a maximum time;
an average time of day for the plurality of responses;
an average input time for the plurality of responses.

In some implementation of the method, the method further comprises applying at least one Machine Learning Algorithm (MLA) to generate at least one of:
the pre-determined minimum answer threshold;
the pre-determined maximum number of solicited responses; and
pre-determined minimum confidence threshold.

In some implementation of the method, the MLA is configured to optimize the at least one of the pre-determined minimum answer threshold; the pre-determined maximum number of solicited responses; and pre-determined minimum confidence threshold such that: minimize a number of the plurality of responses to the digital task required to consider the digital task completed; and maximize an accuracy parameter associated with the label assigned to the digital task.

In some implementation of the method, the plurality of crowd-sourced assessors comprises at least one human assessor and at least one computer-based assessor.

In some implementation of the method, the method results in a dynamic number of responses indicative of a number of the plurality of responses to the digital task required to consider the digital task completed.

In some implementation of the method, the digital task comprises an unknown task and a control task, the control task associated with a known label, and wherein the method further comprises: checking if a first given response to the control task matches the known label; in response to a positive outcome of checking, processing a second given response to the unknown task; in response to a negative outcome of checking, discarding the second given response to the unknown task.

In accordance with another broad aspect of the present technology, there is provided a server for determining a response to a digital task, the digital task executed in a computer-implemented crowd-sourced environment executed by the server, the computer-implemented crowd-sourced environment being accessible by a plurality of crowd-sourced assessors, the method being executed by the server; the server being accessible, via a communication network, by electronic devices associated with the plurality of crowd-sourced assessors, the server being configured to: acquire from a first subset of the plurality of crowd-sourced assessors a plurality of responses to the digital task; determining if a number of the plurality of responses to the digital task meets a pre-determined minimum answer threshold; in response to the number of the plurality of responses to the digital task meeting the pre-determined minimum answer threshold, execute: for each of the plurality of responses generating a confidence parameter representing a probability of an associated one of the plurality of responses being correct; ranking the plurality of responses based on the confidence parameter to determine a top response being associated with a highest confidence parameter; in response to the highest confidence parameter being above a pre-determined minimum confidence threshold, assigning a value of the top response as a label for the digital task and terminating the digital task execution; in response to the highest confidence parameter being below the pre-determined minimum confidence threshold, causing an additional response to be solicited from at least one additional crowd-sourced assessors of the of the plurality of crowd-sourced assessors.

In accordance with yet another broad aspect of the present technology, there is provided a method for determining a response to a digital task, the digital task executed in a computer-implemented crowd-sourced environment, the computer-implemented crowd-sourced environment being accessible by a plurality of crowd-sourced assessors, the method being executed by a server accessible, via a communication network, by electronic devices associated with the plurality of crowd-sourced assessors, the server executing the computer-implemented crowd-sourced environment. The method comprises: acquiring, by the server, from a first subset of the plurality of crowd-sourced assessors a plurality of responses to the digital task; dynamically determining, by the server, if the plurality of responses is sufficient to determine the response to the digital task by: for each of the plurality of responses generating, by the server, a confidence parameter representing a probability of an associated one of the plurality of responses being correct; ranking the plurality of responses based on the confidence parameter to determine a top response being associated with a highest confidence parameter; in response to the highest confidence parameter being above a pre-determined minimum confidence threshold, assigning a value of the top response as a label for the digital task and terminating the digital task execution; in response to the highest confidence parameter being below the pre-determined minimum confidence threshold, causing an additional response to be solicited from at least one additional crowd-sourced assessors of the of the plurality of crowd-sourced assessors.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

An Appendix A is provided at the end of the present specification. The Appendix A includes a copy of a yet to be published article entitled "Text Recognition Using Anonymous CAPTCHA Answers". This article provide additional background information, description of implementations of the non-limiting embodiments of the present technology, as well as some additional examples. The entirety of this article is incorporated herein by reference in their entirety, in all those jurisdictions where such incorporation by reference is allowed.

DETAILED DESCRIPTION

Figure 1:
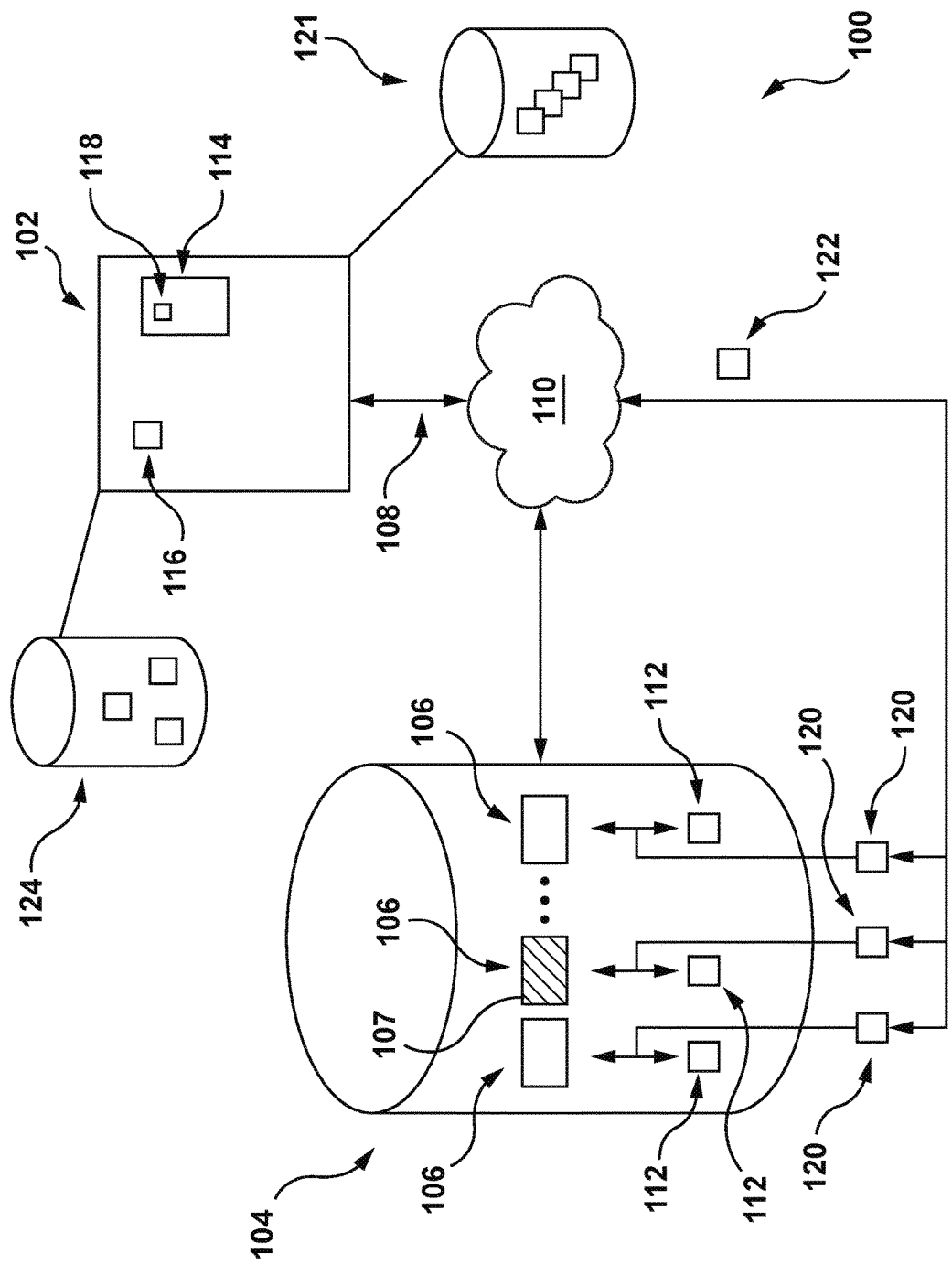
FIG. 1 depicts a schematic diagram of a system implemented in accordance with non-limiting embodiments of the present technology; the system being an example of a computer-implemented crowd-sourced environment executed in accordance with non-limiting embodiments of the present technology.

Referring to FIG. 1, there is shown a schematic diagram of a system 100, the system 100 being suitable for implementing non-limiting embodiments of the present technology. Thus, the system 100 is an example of a computer-implemented crowd-sourced environment 100.

It is to be expressly understood that the system 100 is depicted merely as an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 100 may provide in certain instances simple implementations of the present technology, and that where such is the case they have been presented in this manner as an aid to understanding. As persons skilled in the art would understand, various implementations of the present technology may be of a greater complexity.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope. Furthermore, as an aid to understanding, the following description may describe relatively simplified implementations of the present technology. As persons skilled in the art would understand, various implementations of the present technology may be of greater complexity.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labelled as a "processor" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some non-limiting embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

With these fundamentals in place, we will now consider some non-limiting examples to illustrate various implementations of aspects of the present technology.

The system 100 comprises a server 102 and a database 104 accessible by the server 102.

As schematically shown in FIG. 1, the database 104 comprises an indication of identities of a plurality of assessors 106, who have indicated their availability for completing at least one type of a crowd-sourced task and/or who have completed at least one crowd-sourced task in the past and/or registered for completing at least one type of the crowd-sourced task.

In accordance with the non-limiting embodiments of the present technology, the plurality of assessors 106 can be a plurality of human assessors (i.e. crowd-sourced assessors) who have indicated their desire to participate in crowd-sourced tasks available within the computer-implemented crowd-sourced environment 100.

It is noted that at least some of the plurality of assessors 106 can be a robotic assessor 107 (depicted in FIG. 1 in hashed lines), the robotic assessor 107 being a software application configured to provide responses to the digital tasks provided within the computer-implemented crowd-sourced environment 100. It is noted that the robotic assessor 107 can also be a combination of a robotic assessor and a human assessor, whereby the human assessor can be a proxy for submitting a response generate by the robotic assessor to the computer-implemented crowd-sourced environment 100.

It is further noted that in accordance with the non-limiting embodiments of the present technology, a proportion of human assessors and the robotic assessors 107 within the plurality of assessors 106 can vary. In some non-limiting embodiments of the present technology, the proportion of human assessors and the robotic assessors 107 within the plurality of assessors 106 can be 70:30. In other non-limiting embodiments of the present technology, the proportion of human assessors and the robotic assessors 107 within the plurality of assessors 106 can be 60:40. In yet further non-limiting embodiments of the present technology, the proportion of human assessors and the robotic assessors 107 within the plurality of assessors 106 can be 50:50.

It is noted that the non-limiting embodiments of the present technology allow soliciting a crowd-sourced response for a digital task while meeting a performance metric (e.g. minimize the number of guesses while maximizing the accuracy) even those implementations of the computer-implemented crowd-sourced environment 100 and those digital tasks, where the proportion of the human assessors and the robotic assessors 107 within the plurality of assessors 106 is disproportionately high in favour of robotic assessors 107.

In some non-limiting embodiments of the present technology, the database 104 is under control and/or management of a provider of crowd-sourced services, such as Yandex LLC of Lev Tolstoy Street, No. 16, Moscow, 119021, Russia. In alternative non-limiting embodiments, the database 104 can be operated by a different entity.

The implementation of the database 104 is not particularly limited and, as such, the database 104 could be implemented using any suitable known technology, as long as the functionality described in this specification is provided for. In accordance with the non-limiting embodiments of the present technology, the database 104 comprises (or has access to) a communication interface (not depicted), for enabling two-way communication with a communication network 110.

In some non-limiting embodiments of the present technology, the communication network 110 can be implemented as the Internet. In other non-limiting embodiments of the present technology, the communication network 110 can be implemented differently, such as any wide-area communication network, local area communications network, a private communications network and the like.

It is contemplated that the database 104 can be stored at least in part at the server 102 and/or in any other one or more locations and/or could be managed at least in part by the server 102. In accordance with the non-limiting embodiments of the present technology, the database 104 comprises sufficient information associated with the identity of at least some of the plurality of assessors 106 to allow an entity that has access to the database 104, such as the server 102, to assign and transmit one or more tasks to be completed by the one or more of the plurality of assessors 106.

In accordance with the non-limiting embodiments of the present technology, the database 104 stores a quality score 112 associated with each of the plurality of assessors 106. The quality score 112 of each given one of the plurality assessor 106 indicates a reliability of a given response for a digital task completed by the given one of the plurality of assessor 106, or, in other words, an error rate of the given one of the plurality of assessor 106.

How the quality scores 112 of the plurality of assessors 106 are determined is not limited. For example, the quality scores 112 may be determined based on a first plurality of "honeypot tasks" completed by each of the plurality of assessors 106. In the present specification, the term "honeypot tasks" means a task the correct response of which is known prior to the task being submitted to the given one of the plurality of assessor 106 being tested/assessed for the quality score associated therewith, for completion thereof, which correct response is not provided to the one or more given one of the plurality of assessor 106 being assessed.

The responses of the first plurality of honeypot tasks provided by the plurality of assessors 106 are recorded in the database 104 in a suitable data structure (not depicted). For each given one of the plurality of assessor 106, a percentage of the first plurality of honeypot tasks that the given one of the plurality of assessor 106 completes correctly is calculated and recorded in the database 104 as the quality score 112 of the given one of the plurality of assessor 106. For example, if a given one of plurality of assessor 106 completes twenty honeypot tasks and provides a response matching the corresponding known correct response to eighteen of the twenty honeypot tasks, then the quality score 112 of the given one of plurality of assessor 106 is determined to be 18/20=0.9 (90%). Needless to say, the quality score may be expressed in a number of different formats.

In some non-limiting embodiments of the present technology, the quality scores 112 may be determined based on a statistical analysis of previously completed tasks and checks executed by a trusted human assessor.

At any given time, the plurality of assessors 106 may comprise a different number of human assessors, such as fifty human assessors, who are available to complete tasks and who have corresponding quality scores 112 that are between 0% and 100%. The plurality of assessors 106 could include more or fewer human assessors 106.

The server 102 can be implemented as a conventional computer server. In an example of a non-limiting embodiment of the present technology, the server 102 can be implemented as a Dell™ PowerEdge™ Server running the Microsoft™ Windows Server™ operating system. Needless to say, the server 102 can be implemented in any other suitable hardware and/or software and/or firmware or a combination thereof. In the depicted non-limiting embodiment of the present technology, the server 102 is a single server. In alternative non-limiting embodiments of the present technology, the functionality of the server 102 may be distributed and may be implemented via multiple servers.

The server 102 comprises a communication interface (not depicted) for enabling two-way communication with the communication network 110 via a communication link 108.

How the communication link 108 is implemented is not particularly limited and depends on how the server 102 is implemented. For example, the communication link 108 can be implemented as a wireless communication link (such as, but not limited to, a 3G communications network link, a 4G communications network link, a Wireless Fidelity, or WiFi®, for short, Bluetooth®, or the like) or as a wired communication link (such as an Ethernet based connection).

It should be expressly understood that implementations of the server 102, the communication link 108 and the communication network 110 are provided for illustration purposes only. As such, those skilled in the art will easily appreciate other specific implementational details for the server 102, the communication link 108, and the communication network 110. As such, by no means the examples provided hereinabove are meant to limit the scope of the present technology.

The server 102 comprises a server memory 114, which comprises one or more storage media and generally stores computer-executable program instructions executable by a server processor 116. By way of example, the server memory 114 may be implemented as a tangible computer-readable storage medium including Read-Only Memory (ROM) and/or Random-Access Memory (RAM). The server memory 114 may also include one or more fixed storage devices in the form of, by way of example, hard disk drives (HDDs), solid-state drives (SSDs), and flash-memory cards.

In some non-limiting embodiments of the present technology, the server 102 can be operated by the same entity that operates the database 104. In alternative non-limiting embodiments, the server 102 can be operated by an entity different from the one that operates the database 104.

In some non-limiting embodiments of the present technology, the server 102 is configured to execute a crowd-sourcing application 118. For example, the crowd-sourcing application 118 may be implemented as a crowd-sourcing platform such as Yandex.Toloka™ crowd-sourcing platform, or other proprietary or commercial crowd-sourcing platform.

To that end, the server 102 is communicatively coupled to a task database 121. In alternative non-limiting embodiments, the task database 121 may be communicatively coupled to the server 102 via the communication network 110. Although the task database 121 is illustrated schematically herein as a single entity, it is contemplated that the task database 121 may be configured in a distributed manner.

The task database 121 is populated with a plurality of human intelligence tasks (HITs, hereinafter "digital task" or, simply, "tasks") (not separately numbered). How the task database 121 is populated with the plurality of tasks is not limited. Generally speaking, one or more task requesters (not shown) may submit one or more tasks to be completed in the task database 121. In some non-limiting embodiments of the present technology, the one or more task requesters may specify the type of assessors the task is destined to, and/or a budget to be allocated to each human assessor 106 providing a correct response.

In some non-limiting embodiments of the present technology, a given task of the plurality of tasks could include a labelling task. For example, the labelling task corresponds to a task in which the plurality of assessors 106 are asked to assign one or more labels to a text, a picture, or a document. For example, the labelling task may correspond to the plurality of assessors 106 being provided with a picture, and asked to assign a first label indicative of a presence of a cat in the picture, and a second label indicative of an absence of the cat in the picture.

In some non-limiting embodiments of the present technology, a given task of the plurality of tasks could include a translation task. For example, the translation task corresponds to a task in which the plurality of assessors 106 are asked to input a correct translation of a sentence in a source language (such as French) into a target language (such as English).

In some non-limiting embodiments of the present technology, a given task of the plurality of tasks could include a speech-to-text conversion task. For example, the speech-to-text conversion task may be the plurality of assessors 106 being asked to input a correct textual representation of a recorded spoken utterance.

In some non-limiting embodiments of the present technology, a given task of the plurality of tasks could include an optical character recognition (OCR) task. For example, the OCR task corresponds to a task in which the plurality of assessors 106 are asked to determine a correct textual representation of a text provided on a scanned image. One example of such task is a CAPTCHA recognition task, mentioned herein above.

Figure 2:
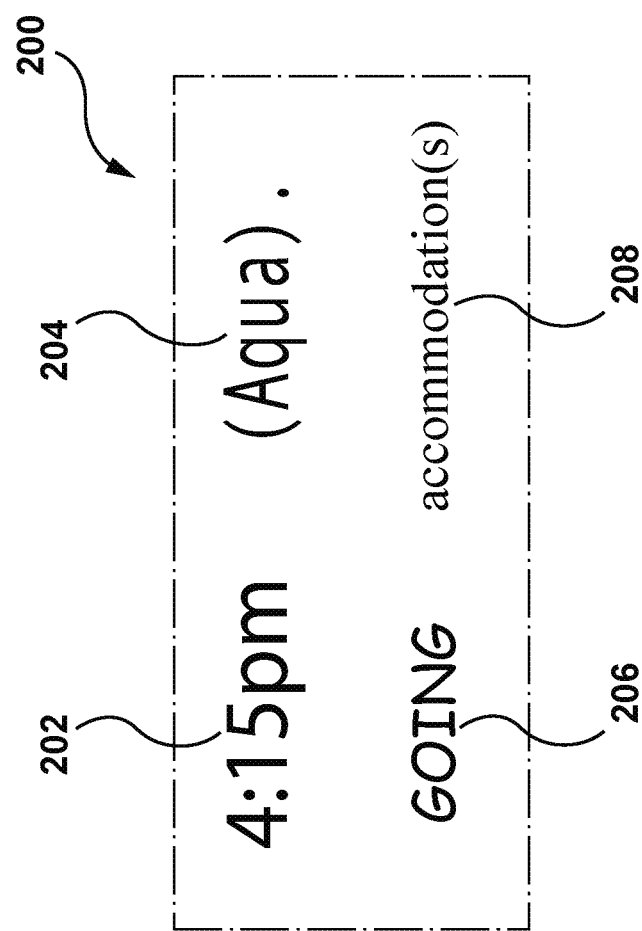
FIG. 2 depicts a non-limiting example of a CAPTCHA task, which is a non-limiting example of a digital task that can be executed within the computer-implemented crowd-sourced environment of FIG. 1.

With reference to FIG. 2, there is depicted a non-limiting example of a CAPTCHA task 200. The non-limiting example of the CAPTCHA task 200 includes a first CAPTCHA task 202, which is an image with a correct response being "4:15 pm". The non-limiting example of the CAPTCHA task 200 includes a second CAPTCHA task 204, which is an image with a correct response being "(Aqua),". The non-limiting example of the CAPTCHA task 200 includes a third CAPTCHA task 206, which is an image with a correct response being "GOING". The non-limiting example of the CAPTCHA task 200 includes a fourth CAPTCHA task 208, which is an image with a correct response being "accommodation(s)".

It should be expressly understood that the non-limiting example of the CAPTCHA task 200 is just one example of a digital task 200 that can be executed in the computer-implemented crowd-sourced environment 100. In some embodiment of the present technology, the digital task 200 is associated with an infinite numbers of correct answers (it is noted that the first CAPTCHA task 202, the second CAPTCHA task 204, the third CAPTCHA task 206, and the fourth CAPTCHA task 208 are just example of an infinite number of possible images and the associated correct responses that can be presented within the computer-implemented crowd-sourced environment 100 for labelling thereof).

In accordance with the non-limiting embodiments of the present technology, the crowd-sourcing application 118 is configured to assign a given task to at least a subset of the plurality of assessors 106, which have indicated their availability in the database 104.

The server 102 is configured to communicate with various entities via the communication network 110. Examples of the various entities include the database 104, respective electronic devices 120 associated with the plurality of assessors 106, and other devices that may be coupled to the communication network 110. Accordingly, the crowd-sourcing application 118 is configured to retrieve the given task from the task database 121 and send the given task to a respective electronic device 120 used by the plurality of assessors 106 to complete the given task, via the communication network 110 for example.

It is contemplated that any suitable file transfer technology and/or medium could be used for this purpose. It is also contemplated that the task could be submitted to the plurality of assessors 106 via any other suitable method, such as by making the task remotely available to the plurality of assessors 106.

In accordance with the non-limiting embodiments of the present technology, the server 102 is configured to receive a set of responses of the digital task 200 that has been completed by the plurality of assessors 106. In accordance with the non-limiting embodiments of the present technology, the set of responses is received by the server 102 in sequence as part of a plurality of data packets 122 over the communication network 110, for example. It is contemplated that any other suitable data transfer means could be used.

In some non-limiting embodiments of the present technology, the server 102 is further communicatively coupled to a log database 124 via a dedicated link (not numbered). In alternative non-limiting embodiments, the log database 124 may be communicatively coupled to the server 102 via the communication network 110, without departing from the teachings of the present technology. Although the log database 124 is illustrated schematically herein as a single entity, it is contemplated that the log database 124 may be configured in a distributed manner.

The log database 124 is configured to store a user activity history (not separately numbered) associated with each of the plurality of assessors 106. For example, the user activity history may correspond to the interactions between the plurality of assessors 106 and the crowd-sourcing application 118, as well as parameters and characteristics of individual interaction. Examples of interactions, as well as parameters and characteristics of the various interactions include, but not limited to:

The time for the plurality of assessor 106 to execute the digital task 200;
A response being changed before being submitting;
The time for a given one of the plurality of assessor 106 to execute the digital task 200;
The type of digital task 200 executed by the plurality of assessor 106.

In some non-limiting embodiments of the present technology, the user activity history may be limited in time or in action. Just as an example, the user activity history may comprise actions executed by the plurality of assessors 106 in the previous 24 hours, or the last 100 actions executed by the plurality of assessor 106 on the crowd-sourcing application 118.

Although in the above description, the user activity history is explained as being different from the quality score 112, it is not limited as such. In some non-limiting embodiments of the present technology, it is contemplated that in addition to the actions executed by the plurality of assessors 106, the user activity history may also comprise the associated quality score 112, or vice-versa.

In some non-limiting embodiments of the present technology, the log database 124 may be unavailable or omitted. Alternatively, the log database 124 may store information about only a portion of the plurality of assessors 106 (such as some or all of human assessors), while it may lack information about others of the plurality of assessors 106 (such as some or all of the human assessors or some or all of the robotic assessors 107). The same applies mutatis mutandis to the quality score 112.

Thus, it should be understood that the non-limiting embodiments of the present technology apply to those implementations of the computer-implemented crowd-sourced environment 100, where the interaction history information and/or the quality score 112 associated with some or all of the plurality of assessors 106 is not available (whether because the log database 124 and/or the database 104 is not present, is not available, or is sparsely populated).

Crowd-Sourcing Application 118

Figure 3:
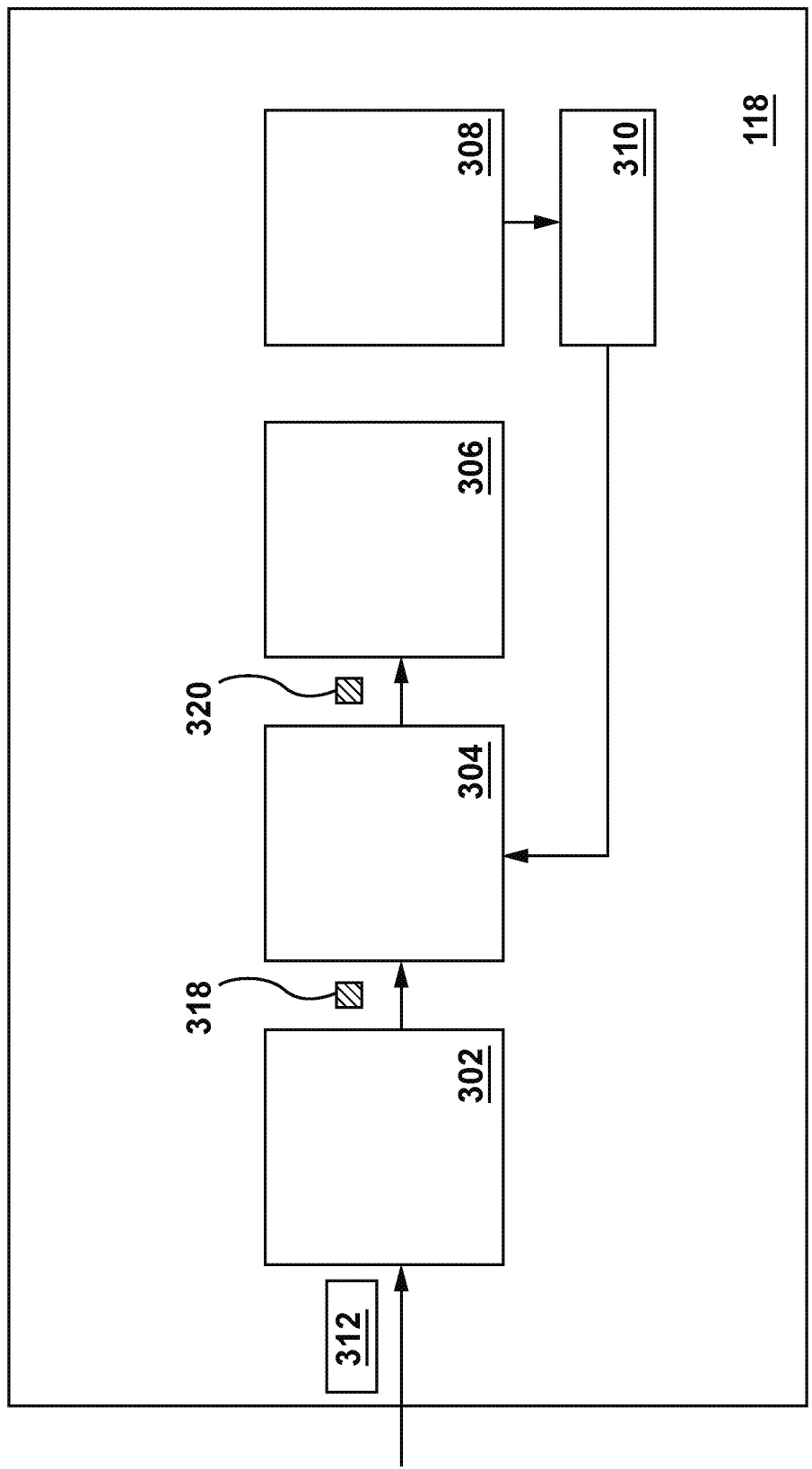
FIG. 3 depicts a schematic diagram of a process for determining a response for a digital task executed in the computer-implemented crowd-sourced environment of FIG. 1.

With reference to FIG. 3, there is depicted a schematic diagram of a process for determining a response for a digital task 200 executed in the computer-implemented crowd-sourced environment 100.

The process for determining the response is executed by the crowd-sourcing application 118 (see FIG. 1) implemented in accordance with a non-limiting embodiment of the present technology. The crowd-sourcing application 118 executes (or otherwise has access to): a response receiving routine 302, a verification routine 304, and an output routine 306. The crowd-sourcing application 118 is further configured to execute an MLA training routine 308 to train a Machine Learning Algorithm 310 (or simply MLA 310) that is used by the verification routine 304, as will be described in greater detail herein below.

In the context of the present specification, the term "routine" refers to a subset of the computer executable program instructions of the crowd-sourcing application 118 that is executable by the server processor 116 (the response receiving routine 302, the verification routine 304, the output routine 306, and the MLA training routine 308). For the avoidance of any doubt, it should be expressly understood that the response receiving routine 302, the verification routine 304, the output routine 306, and the MLA training routine 308 are illustrated herein as separate entities for ease of explanation of the processes executed by the crowd-sourcing application 118. It is contemplated that some or all of the response receiving routine 302, the verification routine 304, the output routine 306, and the MLA training routine 308 may be implemented as one or more combined routines.

For ease of understanding the present technology, functionality of each of the response receiving routine 302, the verification routine 304, the output routine 306, and the MLA training routine 308, as well as data and/or information processed or stored therein are described below.

Response Receiving Routine 302

The response receiving routine 302 is configured to receive a response 312 from the electronic device 120 used by a given one of the plurality of assessors 106, via the data packet 122 (depicted in FIG. 1). In some non-limiting embodiments of the present technology, the response 312 is received in response to the given one of the plurality of assessors 106 accessing and/or logging in into the computer-implemented crowd-sourced environment 100. In some non-limiting embodiments of the present technology, the response 312 is received in response to the given one of the plurality of assessors 106 accessing a list of digital tasks 200 provided by the computer-implemented crowd-sourced environment 100 and selecting one or more digital tasks 200 for execution.

An interface used for the given one of the plurality of for assessors 106 accessing the list of digital tasks 200 provided by the computer-implemented crowd-sourced environment 100 and selecting one or more digital tasks 200 for execution is not particularly limited and can be a web-based interface, an application-based interface, the like. The interface may also include an Application Programming Interface (API) to enable a given one of the plurality of assessors 106 implemented as the robotic assessor 107 to access the computer-implemented crowd-sourced environment 100.

In some non-limiting embodiments of the present technology, the response 212 may be a word representative of a user-assigned label as what the user has perceived to be depicted on an image, such as a CAPTCHA image (as, for example, one of the first CAPTCHA task 202, the second CAPTCHA task 204, the third CAPTCHA task 206, and the fourth CAPTCHA task 208).

In those situations, where the given one of the plurality of assessors 106 is a human assessor, the response will be based on that individual's perception of what is depicted on the image. In those situations, where the given one of the plurality of assessors 106 is the robotic assessor 107, the response will be based on an algorithm used by the robotic assessor 107 for image recognition and processing and its application to the image being processed.

In some non-limiting embodiments of the present technology, the response receiving routine 302 is configured to present the digital task 200 in a form of two parts: an unknown object, which needs to be labelled, and a control object, for which the correct label is known and is used to assess the reliability of the crowd-sourced assessor 106 in which case the response 312 can include both labels assigned by the given one of the plurality of assessors 106. This is particularly applicable, but not limited, in those embodiments of the present technology where the computer-implemented crowd-sourced environment 100 is lacking the interaction history information and/or the quality score 112 associated with some or all of the plurality of assessors 106.

In other words, the digital task 200 can have two sets of images:
W, where each image w∈W contains an unknown word that should be recognized by a portion of the plurality of assessors 106;
$W_c$, where each image w∈$W_c$ contains a known control word.

The response receiving routine 302 is further configured to transmit a data packet 318 to the verification routine 304. The data packet 318 comprises the response 312.

Verification Routine 304

In response to receiving the data packet 318, the verification routine 304 is configured to execute the following functions.

In some non-limiting embodiments of the present technology, where the digital task 200 is in the form of two parts: the unknown object, which needs to be labelled, and the control object, for which the correct label is known, the verification routine 304 can check the control object response first.

If the response for the control image $w_c$ is correct, then the guess for the unknown word w is further processed (i.e. the guess is added the guess to the set $G_w$ of accumulated guesses for the given digital task 200).

If on the other hand, the response to the control object is wrong, the guess for the unknown object can be discarded. Alternatively, the guess for the unknown word can be processed with a decreasing weight. In those embodiments where the response is not processed, a next response is solicited by the response receiving routine 302.

In case the response to the unknown object is selected for processing, the verification routine 304 is configured to determine if a number of a plurality of responses to the digital task 200 received as of a current moment (i.e. the set $G_w$ of accumulated guesses for the given digital task 200), including the response 212 just received, meets a pre-determined minimum answer threshold.

In other words, the verification routine 304 checks if a currently acquired number of responses (guesses) for the given digital task 200 meets a pre-determined minimum $N_{min}$. The number $N_{min}$ is a parameter, which can be set according to a given implementation requirements or it can be fitted to control the accuracy of the non-limiting embodiments of the present technology and the budget spent.

In response to the currently acquired number of responses (guesses) for the given task not meeting the pre-determined minimum $N_{min}$, the verification routine 304 causes the response receiving routine 302 to solicit another one of the responses to the digital task 200 from another one of the plurality of assessors 106.

On the other hand, in response to the currently acquired number of responses (guesses) for the given digital task 200 meeting the pre-determined minimum $N_{min}$, the verification routine 304 is configured to generate for each of the plurality of responses received as of this moment (i.e. the set $G_w$ of accumulated guesses for the given digital task 200) a confidence parameter representing a probability of an associated one of the plurality of responses of the set $G_w$ of accumulated guesses for the given digital task 200 being correct (i.e. being the actual correct label to the digital task 200).

To this end, the verification routine 304 is configured to execute the MLA 310 to generate a prediction of the confidence parameter. How the MLA 310 is trained and how the MLA 310 generates the confidence parameter will be described in greater detail herein below.

The verification routine 304 is then configured to rank the plurality of responses based on the associated confidence parameter to determine a top response being associated with a highest confidence parameter. In response to the highest confidence parameter being above a pre-determined minimum confidence threshold, the verification routine 304 assigns a value (i.e. the response provided by the associated one of the plurality of assessors 106) of the top response as a label for the digital task 200 and terminates the digital task 200 execution.

If, on the other hand, the verification routine 304 determines that the highest confidence parameter is below the pre-determined minimum confidence threshold, the verification routine 304 causes an additional response to be solicited from at least one additional crowd-sourced assessor of the plurality of assessors 106.

In some non-limiting embodiments of the present technology, the verification routine 304 can additionally check if the number of the plurality of responses received at the current moment (i.e. the set $G_w$ of accumulated guesses for the given digital task 200) is below a pre-determined maximum number of solicited responses and only in response to a positive determination, the verification routine 304 solicits additional responses.

If, on the other hand, the number of the plurality of responses is above the pre-determined maximum number of solicited responses, the verification routine 304 does not solicit any additional responses and determined that the digital task 200 can not be completed in the computer-implemented crowd-sourced environment 100.

The verification routine 304 is further configured to transmit a data packet 320 to the output routine 306. The data packet 320 comprises the response 312 representative of the label so assigned to the digital task 200 (or on case the digital task 200 included a control task and an unknown task, the guess for the unknown task).

Output Routine 306

In response to receiving data packet 320 containing the response 312, the output routine 306 is configured to process the task as being completed. For example, the output routine 306 is then configured to calculate and issue a reward to the given ones of the plurality of assessor 106 who has submitted the response 312. The output routine 306 is further configured to store the indication of the label (i.e. the responses 312 selected above) in association with the digital task 200 in the task database 121.

THE MLA Training Routine 308—Training of the MLA 310

Figure 4:
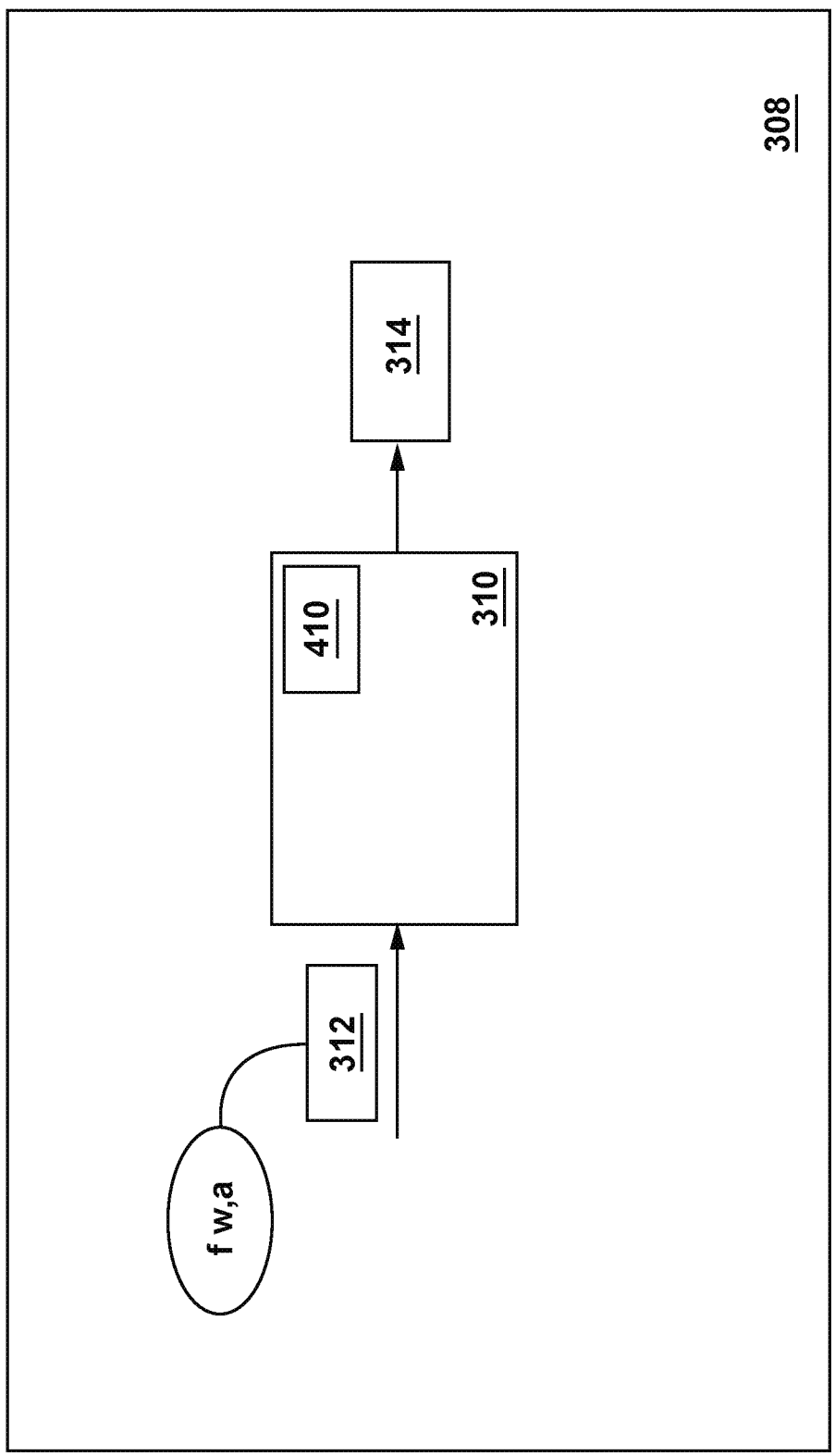
FIG. 4 depicts a diagram of a method for generating a set of training data and training a Machine Learning Algorithm executed in the computer-implemented crowd-sourced environment of FIG. 1.

With reference to FIG. 4, there is depicted a diagram of a method for generating a set of training data and training the MLA 310. The method for training the MLA 310 can be executed by the MLA training routine 308.

In accordance with the non-limiting embodiments of the present technology, the MLA training routine 308 is configured to train the MLA 310 to predict a confidence parameter 314 of a given response (such as the response 312) for a given digital task 200. For confidence parameter 314 estimation, in accordance with the non-limiting embodiments of the present technology, the MLA training routine 308 builds a model based on a vector of features $f_{w,a}$, which describe the given response, the digital task 200 (such as the image being labelled), and accumulated guesses for the given digital task 200.

The purpose of the model is to estimate a conditional probability $P(a=tw|f_{w,a})$ that a given response (i.e. the response 312) is the true answer for the given digital task 200 given features $f_{w,a}$ associated therewith.

In accordance with the non-limiting embodiments of the present technology, the MLA training routine 308 trains a prediction model 410. The prediction model 410 can be based on (but is not so limited) Friedman's gradient boosting decision tree model. However, it should be noted that other decision tree based model or other types of MLA algorithms can be used as well.

Broadly speaking and recalling that the non-limiting embodiments of the present technology can be applied in those implementations of the computer-implemented crowd-sourced environment 100 where the responses 212 can have an infinite number of possible true answers, the prediction model 410 is trained to predict whether the responses 212 is the true answer for any possible guess.

For that purpose, the non-limiting embodiments of the present technology set the target for the dataset to 1 if the given response 212 matches the correct one or 0 if otherwise. This definition of target for the MLA 310 (which can be implemented as a classifier) allows the non-limiting embodiments of the present technology to use the MLA 310 for predictions with a potentially infinite number of classes.

In accordance with the non-limiting embodiments of the present technology, the trained prediction model 410 uses a plurality of features $f_{w,a}$ for predicting whether a given response is a correct response, as outlined immediately above.

| Group | Feature |
|---|---|
| Answer | The responses 212 has capital characters |
|  | The responses 212 has punctuation |
|  | The responses 212 has Latin characters |
|  | The responses 212 has digits |
|  | The responses 212 has Cyrillic characters |
| OCR | The Levenshtein distance (LD) between the responses 212 and the OCR model prediction of the content of the digital task 200 (for example the letters or digits of the CAPTCHA image) |
|  | Confidence for the OCR model's guess estimated by the OCR model |
| Popularity | Fraction of votes for the responses 212 in the responses collected till the current moment |
|  | The Levenshtein distance (LD) between the responses 212 and the MV response |
|  | Fraction of votes for the responses 212 to that for the MV response |
|  | The number of responses for known digital task 200 relative to the number of responses to unknown tasks |
| Position | A ratio for showing the digital task 200 to the left of a control word and that to the right, over all the responses received till this moment |
|  | Fraction of inputs in responses received till this moment when the digital task 200 was to the right of a control word |
|  | Difference between the ratio for showing the digital task 200 to the left of a control word and that to the right, over all the responses received till this moment |
|  | Fraction of inputs in the responses received till this moment when the digital task 200 was to the left of a control word |
| Time | Median input time in $G_w(a)$ relative to the length of the responses 212 in characters |
|  | Average input time for the responses 212 relative to the length of the response in characters |

| Group | Feature |
|---|---|
| | Maximal input time for the responses 212 |
| | 25th percentile input time for the responses 212 |
| | Minimal input time for the responses 212 |
| | Median input time for the responses 212 |
| | 25th percentile time of day for responses 212 |
| | Median time of day for the responses 212 |
| | 75th percentile time of day for the responses 212 |
| | 75th percentile input time for the responses 212 |
| | Minimum input time for the responses 212 relative to the average time |
| | Minimum input time for the responses 212 to the maximum time |
| | Average time of day for the responses 212 |
| | Average input time for the responses 212 |

In additional non-limiting embodiments of the present technology, the prediction model 410 can use the guess of the OCR model, which is denoted by $a_w^{OCR}$ for each word w.

In order to set the parameters $N_{min}$, $N_{max}$, and t, the MLA training routine 310 can run simulations of the algorithm with different combinations of the parameters on the validation dataset. For each combination of the parameters on a grid, the non-limiting embodiments of the present technology calculate the target metrics (e.g. the average number of guesses per word, the average accuracy of the aggregated answers). Finally, the non-limiting embodiments of the present technology settle with the parameters which satisfy our metric requirements (e.g. minimize the number of guesses while maximizing the accuracy).

Accordingly, the first MLA 310 is configured to generate an inferred function which is capable of assigning the error parameter to the response 312 (see FIG. 2) during the in-use phase, based on the set of features associated with the response 312 and the associated user activity history.

Figure 5:
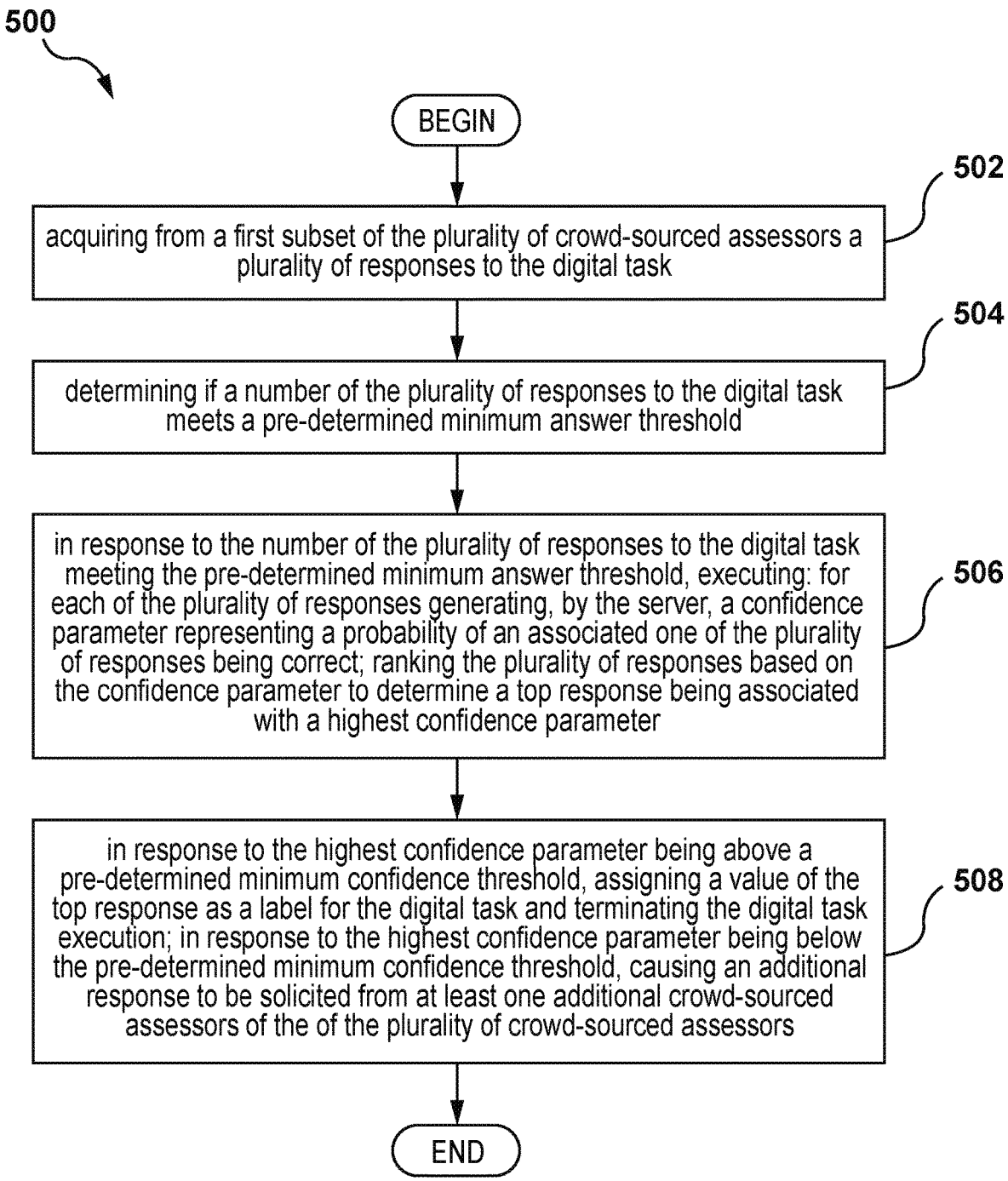
FIG. 5 depicts a block diagram of a flow chart of a method for determining a response of a digital task executed in the computer-implemented crowd-sourced environment of FIG. 1.

Given the architecture and examples provided herein above, it is possible to execute a computer-implemented method for determining a response of a task executed in a crowd-sourced environment. With reference to FIG. 5, there is provided a flow chart of a method 500, the method 500 being executable in accordance with non-limiting embodiments of the present technology. The method 500 can be executed by the server 102. More specifically, certain steps of the method 500 can be executed by one or more of the response receiving routine 302, the verification routine 304, the output routine 306, and the MLA training routine 308.

Step 502—acquiring from a First Subset of the Plurality of Crowd-Sourced Assessors a Plurality of Responses to the Digital Task The method 500 starts at step 502, where the server 102 acquires from a first subset of the plurality of crowd-sourced assessors 106 a plurality of responses 212 to the digital task 200.

Step 504—Determining if a Number of the Plurality of Responses to the Digital Task Meets a Pre-Determined Minimum Answer Threshold At step 504, the server 102 determines if a number of the plurality of responses to the digital task 200 meets a pre-determined minimum answer threshold.

Step 506—in Response to the Number of the Plurality of Responses to the Digital Task Meeting the Pre-Determined Minimum Answer Threshold, Executing: For Each of the Plurality of Responses Generating, by the Server, a Confidence Parameter Representing a Probability of an Associated One of the Plurality of Responses being Correct; Ranking the Plurality of Responses Based on the Confidence Parameter to Determine a Top Response being Associated with a Highest Confidence Parameter At step 506, in response to the number of the plurality of responses to the digital task 200 meeting the pre-determined minimum answer threshold, the server executes: for each of the plurality of responses generating a confidence parameter representing a probability of an associated one of the plurality of responses being correct; ranking the plurality of responses based on the confidence parameter to determine a top response being associated with a highest confidence parameter.

Step 508—in Response to the Highest Confidence Parameter being Above a Pre-Determined Minimum Confidence Threshold, Assigning a Value of the Top Response as a Label for the Digital Task and Terminating the Digital Task Execution; in Response to the Highest Confidence Parameter being Below the Pre-Determined Minimum Confidence Threshold, Causing an Additional Response to be Solicited from at Least One Additional Crowd-Sourced Assessors of the of the Plurality of Crowd-Sourced Assessors At step 508, in response to the highest confidence parameter being above a pre-determined minimum confidence threshold, the server 102 assigns a value of the top response as a label for the digital task 200 and terminating the digital task 200 execution; in response to the highest confidence parameter being below the pre-determined minimum confidence threshold, the server 102 causes an additional response to be solicited from at least one additional crowd-sourced assessors of the of the plurality of crowd-sourced assessors.

In some non-limiting embodiments of the present technology, the server 102 checks if the number of the plurality of responses is below a pre-determined maximum number of solicited responses and in response to a positive determination, the server 102 executes the causing the additional response to be solicited.

If on the other hand, the server 102 determines the number of the plurality of responses is above a pre-determined maximum number of solicited responses, the server 102 does not causes the additional response to be solicited; and instead determines that the digital task 200 can not be completed in the computer-implemented crowd-sourced environment 100.

In some non-limiting embodiments of the present technology, the server 102 is further configured to executed the MLA 310 to optimize the at least one of the pre-determined minimum answer threshold; the pre-determined minimum answer threshold; and pre-determined minimum confidence threshold such that: minimize a number of the plurality of responses to the digital task 200 required to consider the digital task 200 completed; and maximize an accuracy parameter associated with the label assigned to the digital task 200.

As has been alluded to above, the plurality of crowd-sourced assessors 106 comprises at least one human assessor and at least one computer-based assessor.

It should be apparent to those skilled in the art that at least some embodiments of the present technology aim to expand a range of technical solutions for addressing a particular technical problem encountered by the conventional crowd-sourcing technology, namely determining a response to a digital task 200 within the crowd-sourcing environment. In some non-limiting embodiments of the present technology, the approaches to selecting the response for the digital task 200 in the crowd-sourced environment allow for minimizing the number of guesses while maximizing the accuracy.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

While the above-described implementations have been described and shown with reference to particular steps performed in a particular order, it will be understood that these steps may be combined, sub-divided, or reordered without departing from the teachings of the present technology. Accordingly, the order and grouping of the steps is not a limitation of the present technology.

The invention claimed is:

1. A method for determining a response to a digital task, the digital task executed in a computer-implemented crowd-sourced environment, the computer-implemented crowd-sourced environment being accessible by a plurality of crowd-sourced assessors, the method being executed by a server accessible, via a communication network, by electronic devices associated with the plurality of crowd-sourced assessors, the server executing the computer-implemented crowd-sourced environment, the method comprising:

acquiring, by the server, from a first subset of the plurality of crowd-sourced assessors a plurality of responses to the digital task;

determining, by the server, if a number of the plurality of responses to the digital task meets a pre-determined minimum answer threshold;

in response to the number of the plurality of responses to the digital task meeting the pre-determined minimum answer threshold, executing:

for each of the plurality of responses generating, by the server, a confidence parameter representing a probability of an associated one of the plurality of responses being correct;

ranking the plurality of responses based on the confidence parameter to determine a top response being associated with a highest confidence parameter;

in response to the highest confidence parameter being above a pre-determined minimum confidence threshold, assigning a value of the top response as a label for the digital task and terminating the digital task execution;

in response to the highest confidence parameter being below the pre-determined minimum confidence threshold, causing an additional response to be solicited from at least one additional crowd-sourced assessors of the of the plurality of crowd-sourced assessors.

2. The method of claim 1, wherein in response to the highest confidence parameter being below the pre-determined minimum confidence threshold, the method further comprises:

checking if the number of the plurality of responses is below a pre-determined maximum number of solicited responses and in response to a positive determination, executing the causing the additional response to be solicited.

3. The method of claim 2, wherein the method further comprises applying at least one Machine Learning Algorithm (MLA) to generate at least one of:

the pre-determined minimum answer threshold;

the pre-determined maximum number of solicited responses; and pre-determined minimum confidence threshold.

4. The method of claim 3, wherein the MLA is configured to optimize the at least one of the pre-determined minimum answer threshold; the pre-determined maximum number of solicited responses; and pre-determined minimum confidence threshold such that:

minimize a number of the plurality of responses to the digital task required to consider the digital task completed; and maximize an accuracy parameter associated with the label assigned to the digital task.

5. The method of claim 1, wherein in response to the highest confidence parameter being below the pre-determined minimum confidence threshold, the method further comprises:

checking if the number of the plurality of responses is above a pre-determined maximum number of solicited responses and in response to a positive determination, not executing the causing the additional response to be solicited; and determining that the digital task can not be completed in the computer-implemented crowd-sourced environment.

6. The method of claim 1, wherein the digital task is of a type having an infinite number of possible correct answers.

7. The method of claim 6, wherein the digital task is an image recognition task.

8. The method of claim 7, where the image is a CAPTCHA type image.

9. The method of claim 1, wherein the digital task comprises assigning a label to a digital object.

10. The method of claim 9, wherein the label is one of a binary label and a categorical label.

11. The method of claim 1, wherein the generating, by the server, the confidence parameter comprises applying a Machine Learning Algorithm (MLA) to generate the confidence parameter.

12. The method of claim 11, wherein the MLA generates the confidence parameter based on a feature vector, including a plurality of dimensions; a first dimension being associated with a given response; a second dimension being associated with an associated digital task; and a third dimension being associated other responses of the plurality of responses.

13. The method of claim 12, wherein the first dimension includes features representative of at least one of:

whether the given response has capital characters;

whether the given response has punctuation;

whether the given response has Latin characters;

whether the given response has digits;

whether the given response has Cyrillic characters;

a Levenshtein distance (LD) between the given response and an OCR model prediction of a content of the digital task; and a confidence for the OCR model prediction.

14. The method of claim 12, wherein the second dimension includes features representative of at least one of:

a ratio of showing the digital task left or right of a control word, over the plurality of responses received till this moment a fraction of inputs in the plurality of responses received till this moment when the digital task was to the right of the control word;

a difference between the ratio for showing the digital task to the left of the control word and to the right, over all the plurality of responses received till this moment;

a fraction of inputs in the plurality of responses when the digital task was to the left of the control word.

15. The method of claim 12, wherein the third dimension includes features representative of at least one of:

a fraction of votes for a given answer the plurality of responses in the responses collected till the current moment;

a Levenshtein distance (LD) between the plurality of responses and a majority vote response a fraction of votes for the plurality of responses to that for the majority vote response;

a number of responses for known digital tasks relative to a number of responses to unknown tasks;

a median input lime in the plurality of responses relative to the length of the plurality of responses in characters;

an average input lime for the plurality of responses relative to the length of the plurality of response in characters;

a maximal input time for the plurality of responses;

a 25th percentile input time for the plurality of responses;

a minimal input time for the plurality of responses;

a median input time for the plurality of responses;

a 25th percentile time of day for the plurality of responses;

a median lime of day for the plurality of responses;

a 75th percentile time of day for the plurality of responses;

a 75th percentile input time for the plurality of responses;

a minimum input time for the plurality of responses relative to an average time;

a minimum input time for the plurality of responses to a maximum time;

an average time of day for the plurality of responses;

an average input time for the plurality of responses.

16. The method of claim 1, wherein the plurality of crowd-sourced assessors comprises at least one human assessor and at least one computer-based assessor.

17. The method of claim 1, wherein the method results in a dynamic number of responses indicative of a number of the plurality of responses to the digital task required to consider the digital task completed.

18. The method of claim 1, wherein the digital task comprises an unknown task and a control task, the control task associated with a known label, and wherein the method further comprises:

checking if a first given response to the control task matches the known label;

in response to a positive outcome of checking, processing a second given response to the unknown task;

in response to a negative outcome of checking, discarding the second given response to the unknown task.

19. A server for determining a response to a digital task, the digital task executed in a computer-implemented crowd-sourced environment executed by the server, the computer-implemented crowd-sourced environment being accessible by a plurality of crowd-sourced assessors, the method being executed by the server; the server being accessible, via a communication network, by electronic devices associated with the plurality of crowd-sourced assessors, the server being configured to:

acquire from a first subset of the plurality of crowd-sourced assessors a plurality of responses to the digital task;

determining if a number of the plurality of responses to the digital task meets a pre-determined minimum answer threshold;

in response to the number of the plurality of responses to the digital task meeting the pre-determined minimum answer threshold, execute:

for each of the plurality of responses generating a confidence parameter representing a probability of an associated one of the plurality of responses being correct;

ranking the plurality of responses based on the confidence parameter to determine a top response being associated with a highest confidence parameter;

in response to the highest confidence parameter being above a pre-determined minimum confidence threshold, assigning a value of the top response as a label for the digital task and terminating the digital task execution;

in response to the highest confidence parameter being below the pre-determined minimum confidence threshold, causing an additional response to be solicited from at least one additional crowd-sourced assessors of the of the plurality of crowd-sourced assessors.

20. A method for determining a response to a digital task, the digital task executed in a computer-implemented crowd-sourced environment, the computer-implemented crowd-sourced environment being accessible by a plurality of crowd-sourced assessors, the method being executed by a server accessible, via a communication network, by electronic devices associated with the plurality of crowd-sourced assessors, the server executing the computer-implemented crowd-sourced environment, the method comprising:

acquiring, by the server, from a first subset of the plurality of crowd-sourced assessors a plurality of responses to the digital task;

dynamically determining, by the server, if the plurality of responses is sufficient to determine the response to the digital task by:

for each of the plurality of responses generating, by the server, a confidence parameter representing a probability of an associated one of the plurality of responses being correct;

ranking the plurality of responses based on the confidence parameter to determine a top response being associated with a highest confidence parameter;

in response to the highest confidence parameter being above a pre-determined minimum confidence threshold, assigning a value of the top response as a label for the digital task and terminating the digital task execution;

in response to the highest confidence parameter being below the pre-determined minimum confidence threshold, causing an additional response to be solicited from at least one additional crowd-sourced assessors of the of the plurality of crowd-sourced assessors.

* * * * *